United States Patent [19]
Wagner et al.

[11] Patent Number: 5,242,750
[45] Date of Patent: Sep. 7, 1993

[54] PRESSURE- AND VACUUM-MOLDABLE FOAM SHEETING FOR LINING THE INTERIOR OF VEHICLES

[75] Inventors: Werner Wagner, Bad Nenndorf; Heinrich Kracke, Lehrte; Gustav Hildebrandt, Auetal; Reiner Taczkowski; Axel Bruder, both of Hanover, all of Fed. Rep. of Germany

[73] Assignee: J. H. Benecke AG, Beneckeallee, Fed. Rep. of Germany

[21] Appl. No.: 615,605

[22] Filed: Nov. 19, 1990

[30] Foreign Application Priority Data

Nov. 21, 1989 [DE] Fed. Rep. of Germany ....... 3938629

[51] Int. Cl.$^5$ .......................... B32B 3/26; B32B 27/00
[52] U.S. Cl. .................. 428/316.6; 428/319.3; 428/542.2; 428/904
[58] Field of Search ................... 428/316.6, 319.3

[56] References Cited

U.S. PATENT DOCUMENTS

| | | | |
|---|---|---|---|
| 3,954,537 | 5/1976 | Alfter et al. | 156/82 |
| 4,432,580 | 2/1984 | Lohmar et al. | 428/314.4 |
| 4,541,885 | 9/1985 | Candill, Jr. | 428/316.6 |
| 4,576,860 | 3/1986 | Fink et al. | 428/314.4 |
| 4,751,121 | 6/1988 | Kühnel et al. | 428/40 |
| 4,906,516 | 3/1990 | Okamura et al. | 428/319.3 |
| 4,917,944 | 4/1990 | Breitscheidel et al. | 428/308.4 |

FOREIGN PATENT DOCUMENTS

| | | |
|---|---|---|
| 0046839 | 3/1982 | European Pat. Off. |
| 0203399 | 7/1988 | European Pat. Off. |
| 2365203 | 7/1975 | Fed. Rep. of Germany |
| 2721532 | 11/1978 | Fed. Rep. of Germany |
| 7912836.2 | 6/1983 | Fed. Rep. of Germany |
| 3429523A1 | 2/1986 | Fed. Rep. of Germany |
| 2462268 | 2/1981 | France |
| 2022510 | 12/1979 | United Kingdom |

OTHER PUBLICATIONS

Schaumkunststoffe, Entwicklungen und Anwendungen, Berichte von den FSK-Tagungen 1971-1975, Herausgegeben vom Fachverband Schaumkunststoffe e.V. im GKV, Carl Hanser Verlag Munchen Wien, 1976, "Chemisch vernetzter Polyathylen-Schaumstoff".

*Primary Examiner*—George F. Lesmes
*Assistant Examiner*—Terrel Morris
*Attorney, Agent, or Firm*—Darby & Darby

[57] ABSTRACT

A pressure- and vacuum-moldable foam sheeting, consisting of a foam layer, on which is applied a decorative layer, and optionally a primer layer as well as additional layers, for lining the interior of vehicles, is described. It is distinguished owing to the fact that the foam layer has a) a density of approximately 25 to 200 kg/m$^3$, b) an elongation at break according to DIN 53571 of at least about 50% and c) a compression hardness according to DIN 53577 of at least 50 kPa (at 50% deformation). Preferably, the foam layer consists of a polyolefin. This vacuum- and pressure-moldable foam sheeting does not require any PVC material for its foam layer; disposal problems are thus eliminated. Because of the low weight of the foam sheeting, there is very little rejected material during secondary processing. The foam sheeting is distinguished by good mechanical properties and satisfies the demanding delivery conditions of the automobile industry.

16 Claims, 1 Drawing Sheet

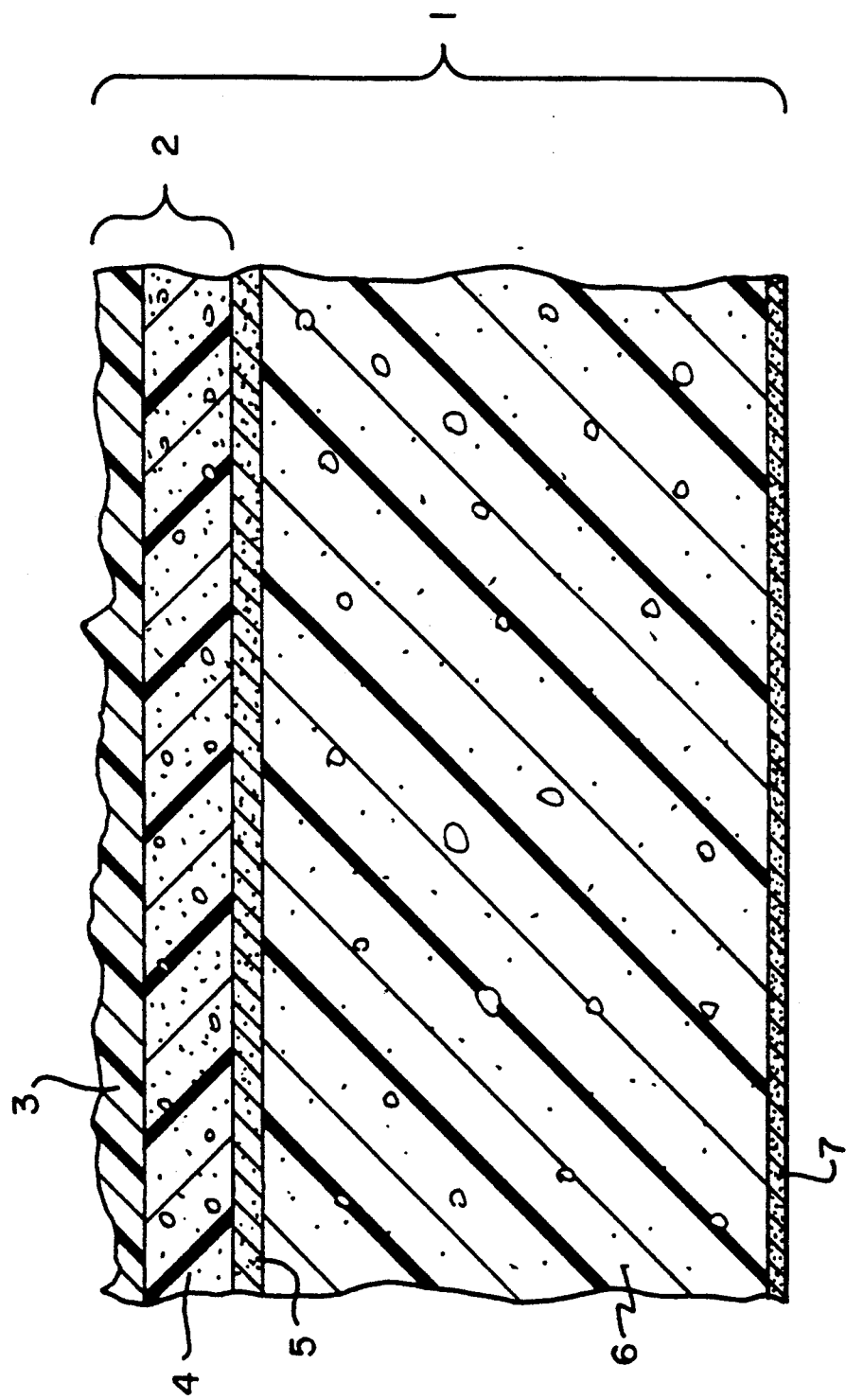

PRESSURE- AND VACUUM-MOLDABLE FOAM SHEETING FOR LINING THE INTERIOR OF VEHICLES

The invention relates to a pressure- and vacuum-moldable foam sheeting consisting of a foam layer with a decorative layer that is applied thereto and, optionally, a primer layer as well as additional layers for lining the interior of vehicles.

Foam sheeting of this kind is known. In order that it can satisfy the requirements of the automobile industry, such sheeting as a rule contains a layer of PVC foam with a PVC protective layer and is therefore also named PVC foam sheeting. It is used to cover the interior parts of vehicles, in particular the interior parts of automobiles, such as the sides, doors, gear-shift consoles, dash padding, columns, seat backs, roof liners, dashboards, and the like. Generally, these have a firm protective layer or decorative layer on a layer of plasticizer-containing PVC foam. This protective layer provides the sheeting with sufficient mechanical strength to resist the stresses imposed during use, such as scratching, jolting, chafing, and the like. The foam layer imparts a certain padded effect to the laminated part and a pleasant feel to the surface. Generally, this material can be adapted so as to provide stability against pressure and heat that is appropriate for various processing methods. The known PVC foam sheeting can be processed in vacuum thermoforming machinery and in hand presses. As a rule, adhesion in both types of machinery is effected with the help of heat-activated adhesives used on joists, by the application of pressure and heat. This process and the quality specifications can be modified.

Taken by and large, the demands imposed by automobile and vehicle manufacturers on pressure- and vacuum-moldable foam are satisfied by the above-described PVC foam sheeting. The fact that such sheeting is based essentially on polyvinyl chloride leads to disposal problems both in the case of rejected material and when the particular vehicle is reduced to scrap value. A further disadvantage of this PVC foam sheeting is its relatively high density, which is usually more than 300 kg/m$^3$. A reduction in weight would be an advantage in this respect.

It is an object of the invention to develop further the pressure- and vacuum-moldable foam sheeting described in the introduction, so that it continues to have the required stability with regard to pressure and heat, the desirable padded effect and a pleasantly soft surface handle as well as the lowest possible density.

Pursuant to the invention, this objective is accomplished owing to the fact that the foam layer has
(a) a density of approximately 25 to 200 kg/m$^3$;
(b) an elongation at break (DIN 53571) of at least 50%;
(c) a compression hardness (DIN 53577) of at least 50 kPa (at 50% deformation).

The essence of the invention accordingly consists therein that a plurality of foamable polymers can be used, provided that after the foaming process these polymers lead to a foam layer that satisfies the features set out in a) to c) above. The PVC materials, which up to now have normally been used for vacuum- and pressure-moldable foam sheetings, do not satisfy these features. However, it would be possible to control the foaming process, so that such a PVC material would also satisfy these requirements. However, the disposal problem already addressed above would be associated with this material. For this reason, it is preferred that a chlorine-free material be used as the foamed material, such as, in particular, polyolefins, preferably polyethylene (PE), polypropylene (PP), ethylene-propylene copolymers (EPM), as well as ethylene/propylene/diene copolymers (terpolymers) (EPTM). These materials are distinguished by the fact that they not only satisfy the above-addressed physical requirements for the inventive vacuum- and pressure-moldable foam sheeting, but also are readily thermally moldable, have outstanding resistance to the effects of high temperature, as well as excellent recovery capabilities, which lead, amongst other things, to the desired "progressive indentation resistance", they also have a fine even, closed cell structure and other good mechanical properties that can be attributed to the above-addressed physical characteristics. Using the above-addressed requirements profile, foam manufacturers can produce the foam layers, particularly on the basis of polyolefins, which are suitable for the purposes of the invention.

The thickness of the foam layer in the inventive vacuum- and heat-moldable foam sheeting is not critical, and can vary widely, depending on the particular application. Generally, it lies between 0.5 and 30.0 mm, preferably between 1.0 and 10.0 mm and, in particular, between approximately 1.4 and 4.0 mm. The density lies between approximately 25 and 200 kg/m$^3$ with the range from 30 to 70 kg/m$^3$ being preferred and the range from approximately 40 to 50 kg/m$^3$ leading to particularly favorable results. As a rule, a conventional PVC foam has a very high density of approximately 30 to 700 kg/m$^3$. Accordingly, pursuant to the invention, an advantageous reduction in weight is achieved by the low density range. The elongation at break according to DIN 53571 is at least 50%, preferably about 100 to 650% and, in particular, about 250 to 450%, and the compression hardness according to DIN 53577 is at least 50 kPa, preferably about 75 to 200 kPa and, in particular, about 100 to 180 kPa at 50% deformation. The tensile strength according to DIN 53571 preferably is at least about 200 kPa, preferably about 300 to 1700 kPa and, in particular, about 500 to 1100 kPa.

The above-described requirements imposed on the foam layer contained in the inventive foam sheeting are satisfied, in particular, by various commercial polyethylene and polypropylene products, the density of which is between 33 and 67 kg/m$^3$, the tensile strength of which is preferably between about 550 and 1060 kPa, the elongation at break of which is between about 280 and 350% and the compression hardness of which is between about 120 and 150 kPa. Such material is also distinguished by the following additional advantages: outstanding physical properties in the static and the dynamic range; amenability to processing so as to render it flame-resistant (DIN 4102; B2 or B1); adjustable softness; a very fine, even and closed-cell structure; a decorative, smooth surface; a high elasticity; excellent thermal deformability; outstanding shock absorption; variable resistance to the effects of high temperature; excellent thermal insulation values; very good impact sound insulation properties; minimal water absorption; very low water-vapor permeability; good resistance to weathering; excellent resistance to chemicals; inert chemical behavior; physiological safety; and environmental friendliness.

It is advisable to configure a decorative layer on the foam layer for practical applications of the inventive vacuum- and heat-moldable foam sheeting. In this respect, the present invention is not subject to any significant limitations. Preferably the decorative layer is constructed in the form of a polyurethane layer and particularly in the form of two layers, namely an external polyurethane protective layer and an internal layer of polyurethane foam. The outer protective layer of polyurethane preferably is approximately 0.1 to 0.3 mm thick, whereas the thickness of the internal layer of polyurethane foam advantageously is 0.2 to 0.6 mm. The ratio of the thickness of the external polyurethane protective layer to that of the internal layer of polyurethane foam preferably is 1:1 to 1:5 and, in particular, about 1:2 to 1:3. The total thickness of the decorative layer can be varied and is not critical. It is set with regard to the particular application of the inventive foam sheeting. For example, it can be in the range from approximately 0.15 to 2.5 mm, preferably between approximately 0.4 to 1.2 mm, with the range from approximately 0.5 to 0.7 mm generally being preferred. In theory, thicknesses greater than 2.5 mm are conceivable. In such cases, however, various advantages of the article, such as the weight, the comfortable feel and the padding effect, will be limited.

To form the polyurethane protective layer, preferably an aliphatic polyurethane is used, which is characterized by good resistance to the effects of light and heat and by favorable mechanical properties. The polyurethane foam layer advantageously is formed on the basis of an aromatic and/or aliphatic polyurethane, which is foamed chemically with a gas-developing agent. It is distinguished by a very even and fine-pored foam and good thermal stability. Similarly advantageous is a decorative layer of a thermoplastic film, regardless of whether this is made up of one or of several layers, based on polyolefins and/or polyolefin copolymers such as EPM, EPDM, and EVA, etc. It has been ascertained that a single layer or multilayer thermoplastic film, based on acrylonitrile-butadiene-styrene copolymers (ABS) and/or polyvinyl chloride (PVC) or ABS/PVC and/or PVC/acrylate-mixed formulations is advantageous. Conventional commercial ABS/PVC films or PVC films can be used for this purpose. However, if a PVC film is used, then the problem of disposal, addressed above, will have to be considered in respect of the particular application.

The decorative layer can be provided with any sort of grain, using conventional technologies. A special product results if a genuine leather grain is produced. If polyurethane is used as the decorative layer, it is also possible to produce a vinyl-like surface; the formation of this surface is described in German Patent 30 04 327. One can also use a process described in German Patent 34 05 985, in order to form the decorative layer.

The decorative layer and the foam layer of the inventive vacuum- and pressure-moldable foam sheeting can be combined with each other by various known technologies. They can also be joined together by means of a normal adhesive as well as by an adhesive film, in particular, by a hot-melt adhesive film. An adhesive layer, which 2-dimensionally and permanently bonds the decorative layer with the foam layer, in particular, the polyurethane foam layer, and which has so much thermoplastic character or is so thin, that it has no negative effects on the processability of the finished material, is especially preferred. This can be a single-layer or multilayer melt adhesive film, which preferably should not be thicker than approximately 0.2 mm. Of advantage is also a single-layer or multilayer pressure-sensitive adhesive layer (solvent or dispersion adhesives) and/or a combination of the two, polyurethane adhesives being used preferably.

In the majority of applications, it is advisable to form a primer layer on the back of the inventive foam sheeting. The construction or chemical characteristics depend on the substrate, upon which the foam sheeting is to be applied. Since the foam layer selected, particularly the polyurethane foam layer, has adhesive properties, it is advisable for the further processing (composite with the support materials) to provide the back of the sheeting with a primer layer to make it permanently compatible with adhesives. To this end, one or more thin layers are applied to the back of the sheeting; on the one hand, these thin layers ensure adhesion to the foam layer and, on the other hand, adhesion to the substrate or support. For this reason, the primer layer must be compatible with the adhesives used during subsequent processing.

FIG. 1 represents a preferred embodiment of the vacuum- and pressure-moldable foam sheeting.

An inventive foam sheeting, which is particularly suitable for the majority of technical applications, consists particularly of the following layers: a polyurethane decorative layer, which is divided into an approximately 0.2 mm thick polyurethane protective layer and an approximately 0.45 mm thick polyurethane foam layer, which is connected to an approximately 2.45 mm thick polypropylene foam layer through an adhesive layer, which is less than approximately 0.15 mm thick. A conventional primer layer, which, if possible, is less than 0.05 mm thick, follows so that the complete foam sheeting is approximately 3.3 mm thick. The appended FIG. 1 shows this construction for a particularly advantageous vacuum- and pressure-moldable foam sheeting. According to this, the decorative layer is made up of a protective polyurethane layer 3 and the polyurethane foam layer 4. This is followed by the layer of adhesive 5, which joins the polypropylene foam layer 6 to the decorative layer 2. Finally, the primer layer 7 follows the foam layer 6.

The inventive foam sheeting is distinguished by numerous advantageous properties. It has a very low weight, particularly compared to conventional PVC sheeting, as well as a high grain stability, in particular when polyurethane protective and foam layers are used in combination with the real-leather look, a good padding effect, and good recovery capability, that is, in particular, an advantageous "progressive indentation resistance," good fogging behavior, good light fastness and good thermal stability. It can be produced without PVC. Further processing can be carried out using conventional procedures, such as thermoforming and press molding. It satisfies to a very high degree the delivery conditions imposed by various automobile manufacturers.

EXAMPLE

The following structure is to be produced:

A decorative layer (a polyurethane protective layer based on an aliphatic polyurethane), approximately 0.2 mm thick A polyurethane foam layer (aromatic polyurethane, foamed thermally with a foaming agent), approximately 0.45 mm thick A subsequent adhesive layer (XIRO ® hot-melt adhesive film, consisting of several layers) one side being modified polypropylene (facing the foam side) and the other being modified polyamide (facing the decorative side), approximately 0.08 to 0.15 mm thick A foam layer (Alveolit TP 2503, polypropylene foam, starting density 40 kg/m$^3$, 3 mm thick), approximately 2.5 mm thick A primer layer (modified polypropylene as a coupling agent in combination with a 2-component polyurethane adhesive) approximately 0.05 mm thick or less.

The film can be produced as follows. A polyurethane release paper or a suitable silicone matrix is coated by means of a doctor blade with the polyurethane high-solid protective layer composition (formulation: 1000 g aliphatic polyurethane (prepolymer with blocked NCO groups), 85 g cross-linking agent (diamine), 40 g pigments, 25 g levelling agent (polyethersiloxane/polyether mixture), and 100 g of filler. This composition is applied moist at a rate of 250 g/m$^2$, then heated progressively to about 165° C. in a continuous oven (channel) and cross-linked. The dry application amounts to 200 g/m$^2$, and the thickness of the protective layer so formed amounts to approximately 0.2 mm. A polyurethane high-solids foam mass (formulation: 100 g aliphatic polyurethane (prepolymer with blocked NCO groups), 90 g of cross-linking agent (diamine), 10 g of pigments, 25 g of levelling agent (polyethersiloxane/polyether mixture), 30 g of foaming agent (sulfohydrazide), 100 g of plasticizer (sulfonamide derivative), and 200 g of filler) are applied to this protective layer with a further doctor blade and then foamed and cross-linked in a second channel at temperatures of up to 175° C. The moist application is made at a rate of 250 g/m$^2$ and leads to a dry application of 200 g/m$^2$. The thickness of the layer so formed is approximately 0.45 mm after foaming. The polyolefin foam (foamed polypropylene) is laminated onto the polyurethane protective layer in a laminating machine at the outlet of the channel with a melt adhesive film such as the above (XIRO ® adhesive layer) and heated with a radiant heater to approximately 150° C. After passing through a cooling drum, the sheeting can be separated from the matrix. The back of the composite sheeting formed is provided with the primer layer in a second step of the process in a printing press (with a least two printing stations) and a drying oven at a temperature of up to approximately 100° C. For this purpose, the following procedure is used. An approximately 8% solution of a modified polypropylene is applied to the foam at the first printing station by means of a screen roller (application approximately 12 g/m$^2$ moist). In a second printing station, an approximately 20% solution of a 2-component polyurethane adhesive is printed onto this coupling agent, which has been aired at room temperature (application approximately also 12 g/m$^2$ moist). Both layers are then aired and cross linked together in a continuous oven.

We claim:

1. A pressure or vacuum-moldable foam sheeting for lining the interior of vehicles, comprising:
   a foam polymer layer:
   a decorative layer carried by the foam layer, the foam layer having
   (a) a density of approximately 25 to 200 Kg/m$^3$;
   (b) an elongation at break according to DIN 53571 of at least 50%; and
   (c) a compression hardness according to DIN 53577 of at least 50 KpA at 50% deformation, the decorative layer consisting of a polyurethane and being made up of two layers consisting of an outer polyurethane protective layer and an inner polyurethane foam layer.

2. The foam sheeting of claim 1, characterized in that the ratio of the thicknesses of the polyurethane protective layer to that of the polyurethane foam layer is about 1:1 to 1:5.

3. The foam sheeting of claim 1, wherein said decorative layer has a grained surface.

4. The foam sheeting of claim 1, wherein said foam layer consists of foamed polyolefin.

5. The foam sheeting of claim 4, characterized in that the polyolefin is polyethylene, polypropylene, an ethylene-propylene copolymer or an ethylene-propylene-diene copolymer.

6. The foam sheeting of claim 1, characterized in that the density is about 30 to 70 kg/m$^3$ and.

7. The foam sheeting of claim 1, characterized in that the foam layer is approximately 0.5 to 30 mm thick.

8. The foam layer of claim 7, characterized in that the foam sheeting is about 1.0 to 10.0 mm thick.

9. The foam sheeting of claim 1, characterized in that the elongation at break is about 100 to 650%.

10. The foam sheeting of claim 1, characterized in that the compression hardness is about 70 to 200 kPa.

11. The foam sheeting of claim 1, characterized in that the decorative layer is joined to the foam layer by means of an adhesive.

12. The foam sheeting of claim 1, characterized in that the total thickness of the decorative layer is about 0.15 to 2.5 mm.

13. The foam sheeting of claim 1, wherein the decorative layer is grained.

14. The foam sheeting of claim 13, wherein the decorative layer provides a real-leather appearance.

15. The foam sheeting of claim 1, wherein the decorative layer provides a vinyl-like appearance.

16. The foam sheeting of claim 1, further comprising a primer layer, the foam layer being arranged between the primer layer and the decorative layer.

* * * * *